United States Patent [19]
Bradbury et al.

[11] 3,922,912
[45] Dec. 2, 1975

[54] ANEMOMETERS

[75] Inventors: Leslie John Stanley Bradbury, Farnham, England; Nicholas Liptay Wagner, Windsor, Canada

[73] Assignee: National Research Development Corporation, London, England

[22] Filed: Feb. 25, 1974
(Under Rule 47)

[21] Appl. No.: 445,549

[30] Foreign Application Priority Data
Feb. 27, 1973 United Kingdom............... 9536/73

[52] U.S. Cl. ............................................... 73/204
[51] Int. Cl.² ............................................ G01F 1/68
[58] Field of Search ........................................ 73/204

[56] References Cited
UNITED STATES PATENTS

| | | | |
|---|---|---|---|
| 3,019,647 | 2/1962 | Beard et al. | 73/204 |
| 3,399,566 | 9/1968 | Brown | 73/204 |
| 3,807,228 | 4/1974 | Matzuk | 73/204 |

*Primary Examiner*—Herbert Goldstein
*Attorney, Agent, or Firm*—Cushman, Darby & Cushman

[57] ABSTRACT

An anemometer is described in which a pulse of electric current is passed through a first wire to heat gas passing over the wire. Two further wires on either side of the first wire are connected in a bridge circuit to sense the heated gas. The velocity of the gas is indicated by automatically measuring the time between the heating pulse and the sensing of the heated gas by one of the further wires. In order to reduce the effect of signals induced electromagnetically in the sensing wires by the heating pulse an inhibit circuit constructed to introduce as little disturbance as possible, is coupled between the bridge and the time measuring circuits. The inhibit circuit has two paths which are both operative until after the induced pulse has occurred. The outputs from these paths are as far as possible, equal and opposite, and therefore cancel until one path is rendered inoperative before the pulse to be sensed occurs.

15 Claims, 4 Drawing Figures

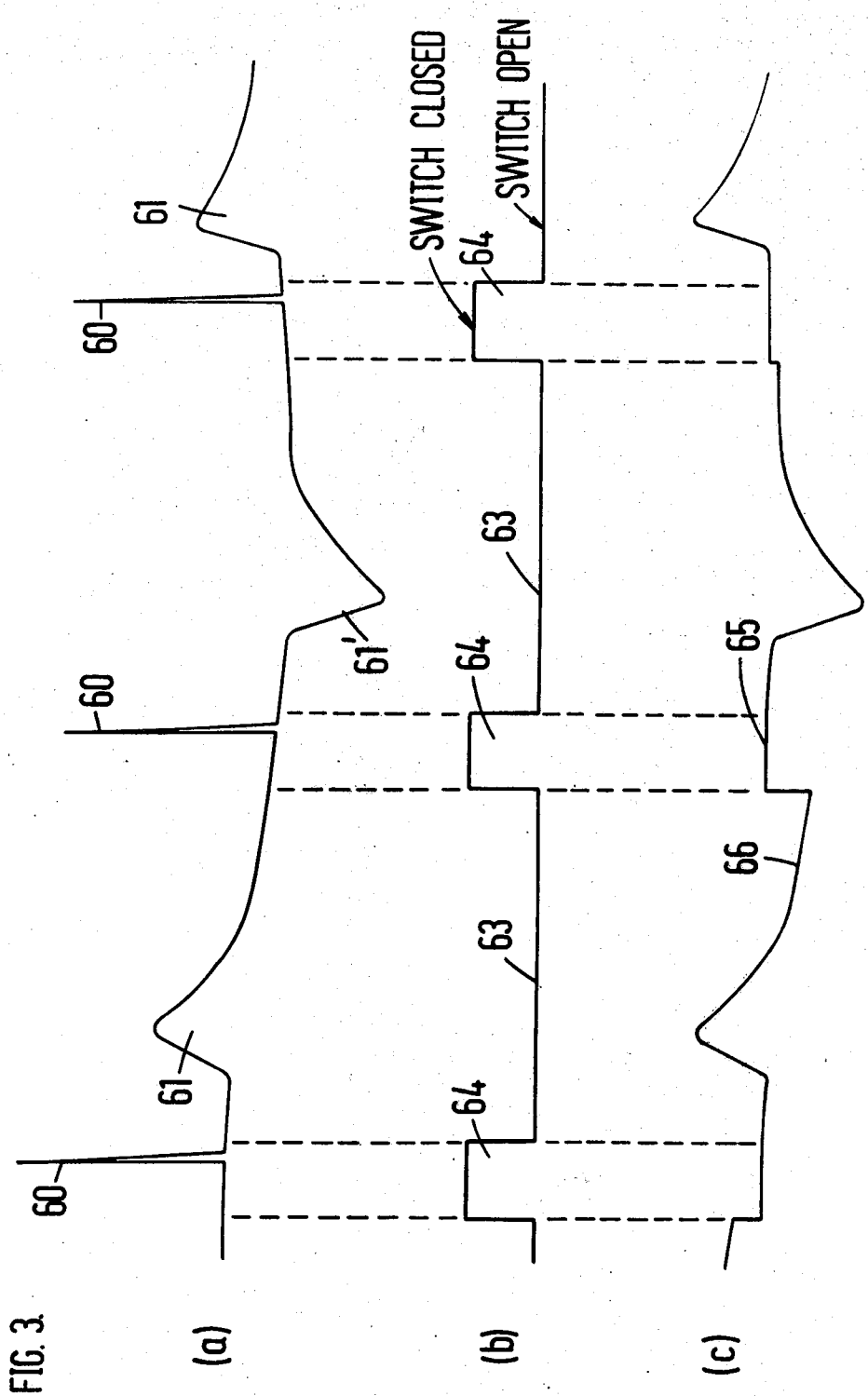

ANEMOMETERS

The present invention relates to anemometers in which a portion of gas is heated locally for a short interval and the resultant tracer of heated gas is sensed after it has travelled a short distance. The time of flight of the tracer is measured to provide an indication of gas velocity.

Anemometers of this type are known in which a current pulse is passed through a first wire situated in a gas stream and the change of resistance of a sensor wire, on being heated by the hot gas of the tracer, is used to sense the arrival of the tracer. However, the current pulses cause spurious pulses to be generated in the sensing wires due to capacitance and electro-magnetic induction. This problem can be some extent be overcome by using two sensor wires, one on each side of the heating wire and coupling the sensing wires to a differential amplifier so that two spurious pulses, one generated in each sensing wire, cancel each other, but the remaining reduced spurious pulse is still many times larger than pulses generated by the tracer at the sensing wires. For example in one apparatus the remaining spurious pulse is a few millivolts in amplitude while the heat generated pulses are typically of about 100 microvolts in amplitude.

According to the present invention there is provided apparatus for measuring the velocity of fluids, including electrical heating means for locally heating a flowing fluid for short intervals in response to current pulses passed through the heating means, a temperature sensitive element for providing an electrical signal dependent on the temperature of the fluid, the temperature sensitive element being in operation positioned, at least partially, in the path of heated fluid from the heating means, means for detecting changes in an electrical signal coupled to the temperature sensitive element, timing means for providing an indication of the duration of the intervals between each current pulse and each consequent said change, and an inhibit circuit coupled in the path of the said electrical signal to the means for detecting changes, the inhibit circuit comprising means for combining, in opposition, signals along two substantially electrically equivalent paths, one of the said paths including switch means adapted to provide continuity in the said one path, when each of the current pulses occurs, for an interval which terminates before the heated gas is expected to reach the temperature sensitive element.

In this way spurious pulses in the signal from the temperature sensitive element caused by the current pulses, cancel out as each such pulse after travelling along the said two paths reaches the combining means.

Preferably the heating means includes a first wire located at the end of a probe which also has a second wire which forms part of the temperature sensitive element and a third wire, on the opposite side of the first wire from the second wire, forming part of a second temperature sensitive element. The first and second wires may be connected as adjacent arms in a bridge circuit, the other two bridge arms being formed by variable resistors.

The provision of the third wire is especially useful in measuring turbulent flow since sudden changes in current direction and small eddies can be detected. For such measurements the heating wire is repeatedly pulsed and an entire ensemble of velocity values is obtained from which both the mean velocity and intensity can be deduced. Furthermore, the velocity and intensity in any direction can be obtained by aligning the probe in the appropriate direction. A restriction on the use of the probe is due to the influence of turbulent eddies which have a scale length that is smaller than the probe dimensions.

The output of the bridge may advantageously be coupled to the two inputs of a wide band, preferably low-noise, differential amplifier. A wide band amplifier is also advantageous even where only one temperature sensitive element, coupled to its input, is used since it prevents the spurious pulses being elongated by ringing.

The said means for combining two signals in opposition preferably includes a further differential amplifier with one input coupled to one of the two paths and the other input coupled to the other path. The output of the further differential may be connected to a low pass filter to reduce noise in the signal passed to the means for detecting changes.

The means for detecting changes in an electrical signal preferably includes a differentiating circuit, and first and second comparator circuits for detecting when the output signal from the differentiating circuit exceeds predetermined levels in one and the opposite polarities, respectively.

The switch means advantageously includes an electronic switching element such as a field-effect transistor (FET) or a junction transistor. A pulse is then passed from a timing control circuit, which also initiates the current pulses, to switch on the FET or transistor for an interval when a current pulse is initiated. The path which includes the switch means may also include a shunt capacitor connected on the output side of the switch means to hold the voltage at the output of the switch means when the switch opens. The other of the said two paths may include a variable resistor and a shunt capacitor to allow the electrical characteristics of the two paths to be made substantially equivalent. The time constant of the switch means when closed and the shunt capacitor connected thereto is short compared with the interval between a current pulse and the time at which heated gas is consequently sensed. On the other hand the impedance which this capacitor feeds is preferably high so that the output voltage of the switch can be held between current pulses. This may be achieved by connecting each shunt capacitor to an FET follower, particular thereto.

The advantage of this way of removing spurious pulses over, for example an FET which provides continuity to the means for detecting changes only when the spurious pulse has subsided, is that such an FET would generate further large spurious pulses when continuity was restored.

An embodiment of the invention will now be described, by way of example, with reference to the accompanying drawings, in which:

FIG. 3 are waveform diagrams used in explaining the operation of the anemometer of FIG. 1.

Figure 1:
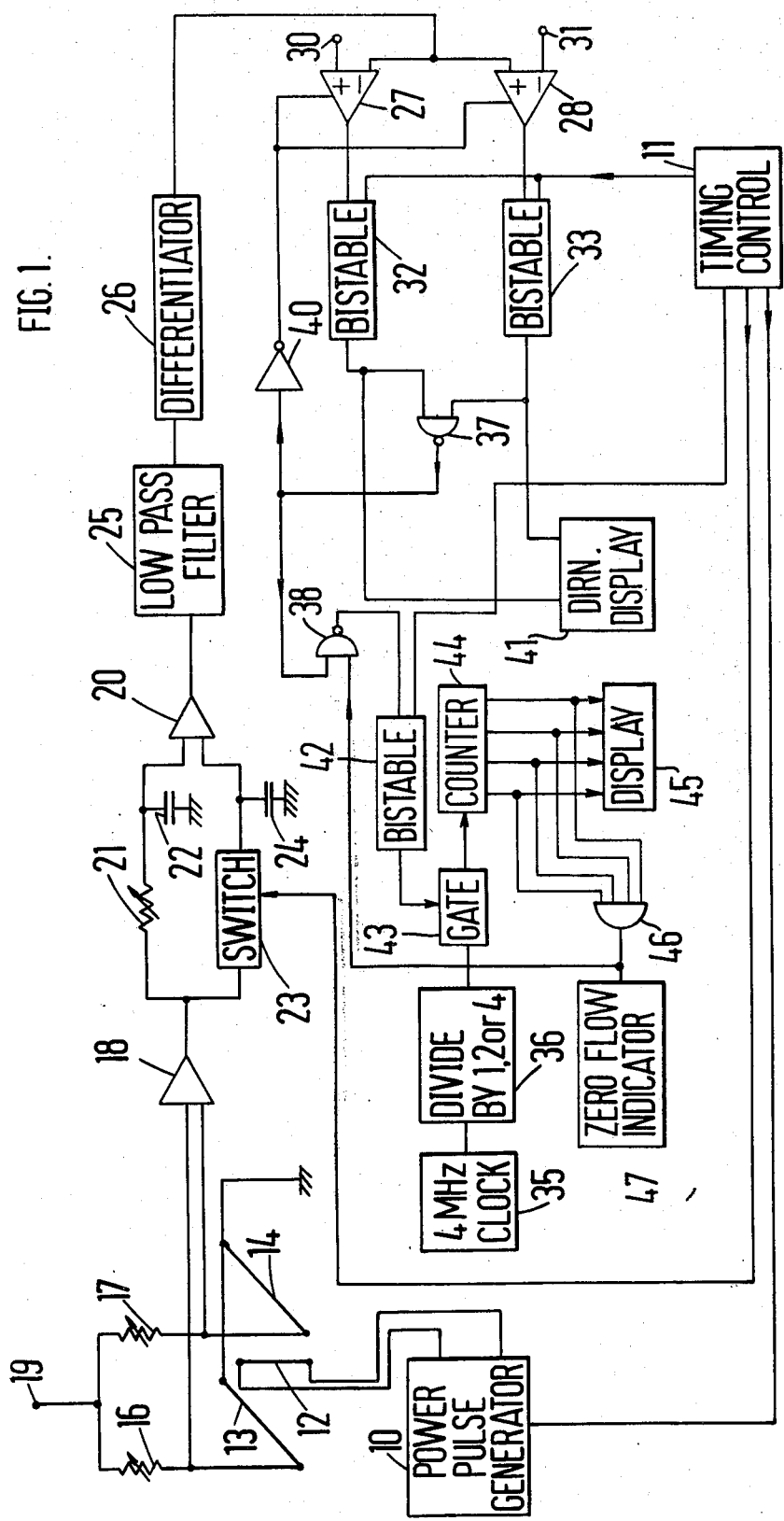
FIG. 1 is a block diagram of an anemometer according to the invention.

In FIG. 1 a power pulse generator 10, under the control of a timing circuit 11, applies current pulses to a nickel wire 12, each pulse raising the temperature of the wire by several hundred degrees centigrade. A probe shown in FIG. 2, includes the wire 12 and two sensor tungsten wires 13 and 14, connections for the wires being brought out through an insulating holder 15. The probe is located in a stream of gas, for example air, to allow the gas velocity to be measured and the current pulses in the wire 12 heat the gas locally, producing a tracer of heated gas which is detected later by the sensor wires 13 and 14. The interval between each current pulse and the detection of a subsequent rise in gas temperature giving the gas velocity. Only when the direction of gas flow is in the plane of the wires 13 and 14 and normal to these wires is the true velocity determined. At other times the component of velocity in the said plane and normal to the wires 13 and 14 is determined.

The timing control circuit 11 generates 5 microsecond fixed-amplitude pulses with a repetition rate which can be adjusted, using manual controls, in the range 2 to 20 pulses per second. A control is also provided to allow single pulses to be generated under manual control. The pulses, single or repetitive, are applied to a transistor switch in the power pulse generator 10 connected to pass up to 8 amperes through the wire 12. The voltage applied to the transistor switch can be set using a further manual control.

A small current is passed through the wires 13 and 14 from a 1.5 V battery connected to a terminal 15. Variable resistors 16 and 17 allow this current to be adjusted and allow the voltages at the input terminals of a variable-gain differential amplifier 18 to be made equal during setting up when the wires 13 and 14 are at the same temperature.

Figure 2:
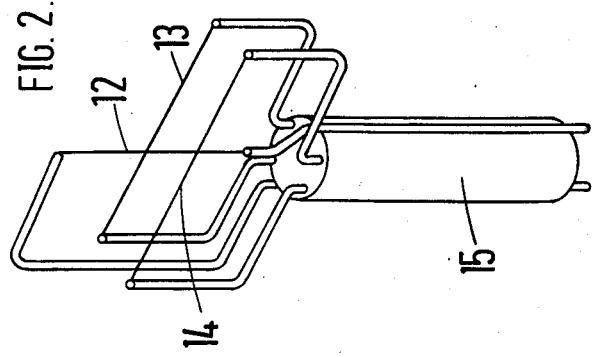
FIG. 2 is a schematic diagram of a probe used in the anemometer of FIG. 1.

As has been mentioned each current pulse in the wire 12 causes a spurious pulse to appear in the wires 13 and 14 due to electromagnetic induction and capacitance between the wires, even when the capacitance between the various wires is reduced as much as possible, and as shown in FIG. 2 the planes of the loops formed by the wire 12, and the wires 13 and 14 are normal to one another to reduce induction. The spurious pulses are almost eliminated at the output of the amplifier 18 by common mode rejection but the remnant is larger than the pulses generated in wires 13 and 14 by heated gas.

To overcome this problem the output of the amplifier 18 is connected by two paths to the input terminals of a differential amplifier 20. One path comprises a variable series resistor and a shunt capacitor 22, and the other path comprises a switch 23, for example an FET, and a shunt capacitor 24, equal to the capacitor 22. For the duration of each spurious pulse the switch 23 is closed so that the amplifier 20 receives equal input signals and has no output signal. Before a sensor-generated pulse due to a change in temperature of one of the wires 13 and 14 is received the switch 23 is opened by the timing control circuit and the amplifier 20 passes the sensor generated pulse to a low pass filter 25.

The capacitor 24 holds the level at the output of the switch after the switch has opened to avoid the appearance of a step in the output signal of the amplifier 20. The capacitor 22 balances the capacitor 24 so the two paths have similar characteristics. The effect of this circuit on the sensor wire signals is summarised in the waveform diagrams shown in FIG. 3. The waveform of FIG. 3(a) shows the signal from the sensor wire circuit with the spurious pulses 60 and the sensor pulses 61 and 61' resulting from the heat traced signals. An effect which might for example be due to turbulence is shown in that a pulse 61' indicates reverse flow. FIG. 3(a) also shows a general fluctuation in the signal from the sensor wires which might, for example, arise from temperature fluctuations in the flow. The waveform of FIG. 3(b) shows the intervals when the switch 23 is open (63) and closed (64). The waveform 3(c) shows the resultant signal from the differential amplifier 20. It should be noted that not only are the spurious pulses eliminated but the circuit also causes the sensor pulses from the differential amplifier 20 to start from the same baseline voltage each time a heat pulse occurs. The reason for this is that the output of the amplifer 20 is connected at 65 for example, when signals are received at both its inputs, since the difference signal is amplified, and any drift is the same at both inputs. Drift does appear in the output when only one input is connected as at 66. The circuit for suppressing spurious pulses will be described in more detail later.

The function of the low pass filter 25 is to improve the signal to noise ratio of signals from the amplifier 20 and to this end it has a cut-off frequency of 8 KHz. This cut-off frequency is determined by the time constant of the wires 13 and 14. With wires of 0.0001 inches and 0.0002 inches diameter the time taken for the wires to respond to a step change is in the region 0.25 to 1 millisecond, and the cut-off frequency is set well above the corresponding wire time constants so that no components of the sensor wire signals are removed.

The signal from the filter 25 is now differentiated by a circuit 26 to provide rectangular pulses which are then applied to differential amplifiers 27 and 28 functioning as comparators.

Due to the finite thermal inertia of the sensor wires, the rise time of the sensor wire signals is much longer than that of the flow temperature. However, the use of the differentiation circuit 26 results in a signal which again has a short rise time and which will trigger the comparators 27 and 28 in a time which is very close to the time of flight of the heat tracer. Thermal diffusion can be shown to have only a small influence on the above processes.

The polarity of the sensor-generated pulses at the input to the amplifier 20 depends on whether a change in temperature is sensed by the wire 13 or the wire 14. Thus one of the comparators 27 and 28 will provide a positive output signal if gas flow is in one direction across the probe, and the other will provide such a signal for the other flow direction. The positive and negative levels which have to be exceeded before these signals are provided are set by adjusting reference voltages applied to terminals 30 and 31, respectively. The amplifiers 27 and 28 are coupled to bistable circuits 32 and 33, respectively, so that when one of these bistable circuits is set gas flow is in one direction and when the other bistable circuit is set the gas flow is in the other direction. The bistable circuits 32 and 33 are connected to a direction display unit 41 which indicates when either bistable is set and thus indicates the direction of gas flow.

An OR gate 37 is also connected to the bistable circuits 32 and 33 to pass a signal to a further OR gate 38 when either bistable is set. The OR gate 38 is connected to a further bistable circuit 42 which, when set, closes a gate 43 connected in a path for clock pulses between a clock pulse generator 35 and a counter 44. The bistable circuit 42 is reset each time a pulse from the generator 10 is initiated, opening the gate 43 and causing the counter to count pulses at a rate determined by a divide circuit 36, which can be set manually to divide by 1, 2 or 4. As soon as a heat pulse is sensed one of the bistable circuits 32 or 33 is set, setting the bistable circuit 42, closing the gate 43 and stopping the count. The contents of the counter 44 are indicated by a display 45. Hence the count displayed is representative of the time between a heating pulse and a sensor generated pulse and gives an indication of the gas velocity. The arrows between the counter 44 and the display 45 indicate that both counter and display are multistage devices. The scale factor of the display can be varied by changing the ratio in the division circuit 36.

Should there be no gas flowing the counter 44 will reach a state in which each of its stages are set to the binary state "one" and if this occurs an AND gate 46 opens, causing an indicator 47 to indicate zero gas flow, and passing a signal to the OR gate 38 which by setting the bistable circuit 42 closes the gate 43 preventing the counter from recycling. An inverter 40 is coupled between the OR gate 37 and the comparators 27 and 28 to disable the comparators once a sensor-generated pulse has occurred. This prevents one bistable being set, once the other has been set, by a second sensor-generated pulse occurring when heated gas reaches that sensor wire which is located in the upstream direction.

The timing control circuit 11 may simply be a pulse generator which supplies single pulses under manual control, or pulses at a variable repetition frequency, to initiate current pulses from the generator 10, and to perform the various control functions at the bistable circuits 32, 33 and 42, and the switch 23.

Figure 4:
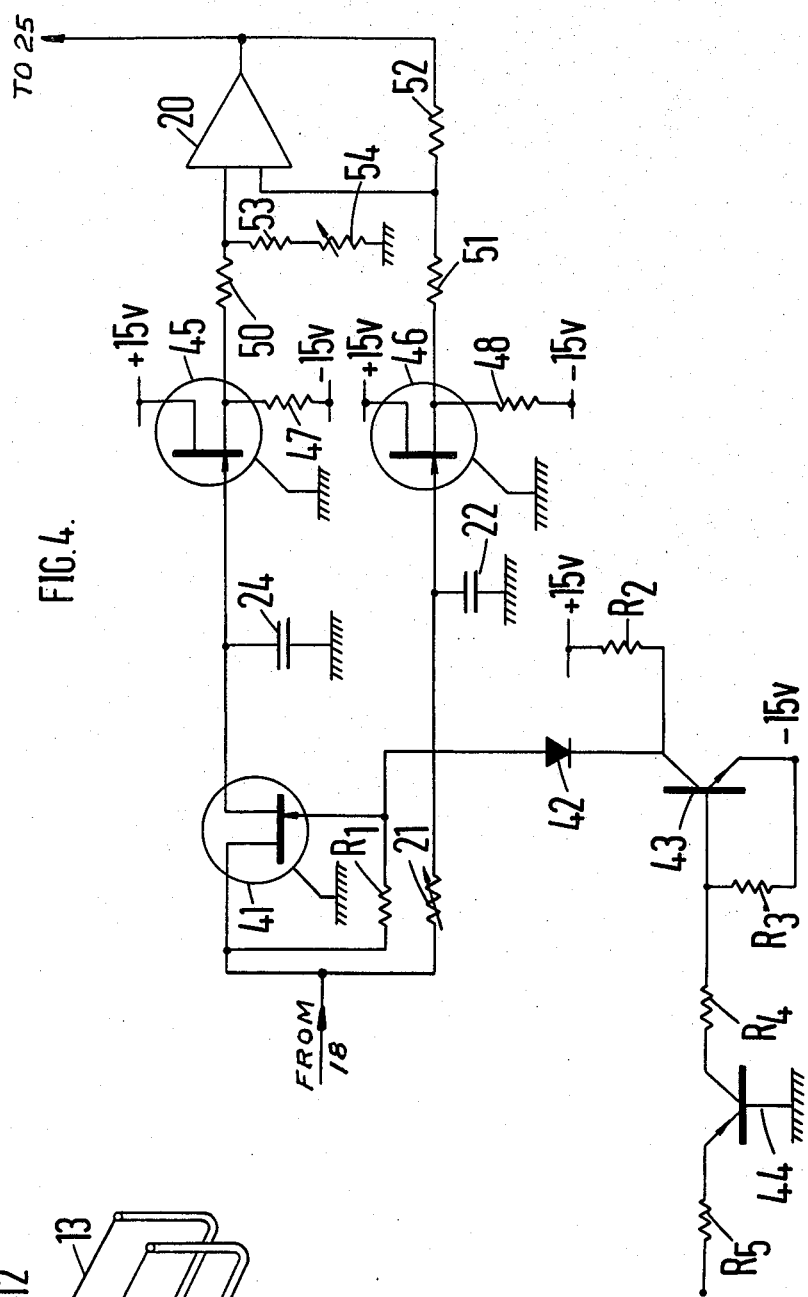
FIG. 4 is a circuit diagram of the spurious pulse suppression circuit of FIG. 1.

The circuit for removing spurious pulses is shown in more detail in FIG. 4 which shows what is essentially a sample and hold circuit. The switch 23 of FIG. 1 includes a 2N3824 FET 41 with its source and drain terminals series connected between the output of the amplifier 18 and the capacitor 24. The gate terminal of the FET 41 is connected by way of an IN914 diode 42 to the collector of a BSX20 transistor 43 which is driven through a BCY71 transistor 44 by TTL inhibit pulses from the timing control circuit 11. These pulses must therefore be long enough to hold the FET41 conducting until the spurious pulse is over. A number of biasing and load resistors, as follows, are used for these transistors 41, 43 and 44: $R_1$(100KΩ), $R_2$(5.6KΩ), $R_3$(220Ω), $R_4$(1.5KΩ) and $R_5$(820Ω).

In order to ensure a close approach to complete symmetry in the two input paths to the amplifier 20, the variable resistor 21 has a maximum value of 500 Ω so that it can be adjusted to have the same value as the "on" resistance as the FET 41. The hold capacitor 24 following the FET is a low loss polyester 2200pF capacitor, the capacitor 22 being of the same type and value, again to ensure symmetry.

In order to prevent "ringing" in the amplifier 18 K Ω would lengthen the spurious pulses, the bandwidth of the amplifier is wide (120 KHz), and in addition the time constant formed by the FET 41 and the capacitor 24 must be much less than the spurious pulse length. A suitable value for this time constant is 0.5 microseconds. However, in order to prevent the voltage on the capacitors 22 and 24 from decaying appreciably between heating pulses and sensor-generated pulses, the impedances following these capacitors are large. This requirement is met by two BFS21A FET followers 45 and 46, with associated 12KΩ resistors 47 and 48.

The FETS 45 and 46 are coupled by way of 10K Ω resistors 50 and 51 to the amplifier 20 which is a 741 operational amplifier, with a 10K Ω external resistor 52, connected as a differential amplifier. A fixed 82K Ω resistor 53 and a variable resistor 54 are connected in shunt with one amplifier input to allow the gain of the amplifier 20 from both inputs to be balanced.

It will be appreciated that the invention can be put into practice in many other ways than those specifically described, using different circuits, a different arrangement of heat pulse wire and sensor wires, and different arrangements for the switch used in suppressing spurious signals.

We claim:

1. Apparatus for measuring the velocity of fluids, including
   electrical heating means for locally heating a flowing fluid for short intervals in response to current pulses passed through the heating means,
   a temperature sensitive element for providing an electrical signal dependent on the temperature of the fluid, the temperature sensitive element being in operation positioned, at least partially, in the path of heated fluid from the heating means,
   means for detecting changes in the said electrical signal,
   timing means for providing an indication of the duration of the intervals between each current pulse and each consequent change in the said electrical signal, and
   an inhibit circuit comprising means for combining, in opposition, signals along two substantially electrically equivalent paths each of which is coupled to receive the said electrical signal, one of the said paths including switch means having continuity means for providing continuity in the said one path and control means for controlling the continuity means to provide continuity when each of the current pulses occurs for an interval which terminates before the heated fluid is expected to reach the temperature sensitive element, the means for combining signals being coupled to pass its output signal to the means for detecting changes.

2. Apparatus according to claim 1 wherein
   the heating means includes a first wire,
   the temperature sensitive element includes a second wire,
   a further temperature sensitive element which includes a third wire is provided, the third wire being located on the opposite side of the first wire to the second wire,
   the second and third wires being connected as adjacent arms in a four arm electrical bridge, with the other arms being formed by electrical resistors, and the bridge output being coupled to the said inhibit circuit.

3. Apparatus according to claim 2 wherein
   the first, second and third wires are positioned, spaced apart from one another, with the second and third wires parallel to one another but orthogonal to the first wire.

4. Apparatus according to claim 3 wherein the three wires are positioned at the end of a probe.

5. Apparatus according to claim 3 including
   a wide-band differential amplifier having one input terminal coupled to one output terminal of the bridge, and the other input terminal coupled to the other bridge output terminal, the output of the said wide-band differential amplifier being coupled to the said two paths of the inhibit circuit.

6. Apparatus according to claim 1 wherein the heating means includes a first wire, and the temperature sensitive element includes a second wire orthogonal to the first wire.

7. Apparatus according to claim 6 including a wide-band amplifier coupled to the temperature sensitive element.

8. Apparatus according to claim 3 wherein the said means for combining two signals in opposition includes a further differential amplifier with one input coupled to one of the two paths, the other input coupled to the other path, and output coupled to the said means for detecting changes.

9. Apparatus according to claim 3 wherein the continuity means includes an electronic switching element, and the control means is constructed to initiate the said current pulses and to render the switching element conductive for an interval, when each current pulse is initiated.

10. Apparatus according to claim 9 wherein the path which includes the switch means also includes a first shunt capacitor connected on the output side of the switch means to hold the voltage at the output of the switch means when the switch opens, the combined time constant of the switch means, when closed, and the first shunt capacitor being short compared with the interval between a current pulse and the time at which heated gas is sensed.

11. Apparatus according to claim 10 wherein the path which does not include the switch means includes a variable resistor and a second shunt capacitor allowing the electrical characteristics of the two paths to be made substantially equivalent.

12. Apparatus according to claim 11 including first and second voltage-follower circuits connected between the first and second shunt capacitors, respectively, and the said means for combining signals in opposition.

13. Apparatus according to claim 9 wherein the means for detecting changes in an electrical signal includes
a differentiating circuit, and
first and second comparator circuits for detecting when the output signal from the differentiating circuit exceeds predetermined levels in one and the opposite polarities, respectively.

14. Apparatus according to claim 13 including first and second bistable circuits coupled to the outputs of the first and second comparator circuits, respectively, each bistable circuit being set to a first state when the output signal of the comparator to which it is connected indicates that one of the said predetermined levels has been exceeded, and each bistable circuit being connected to disable the comparator which it is not coupled to when in the said first state.

15. Apparatus according to claim 14 wherein the timing means includes
a pulse oscillator, and
a counter coupled to the pulse oscillator by way of a gate circuit, the gate circuit being connected to be opened by the timing control circuit each time a current pulse is initiated, and
each bistable circuit being connected to close the said gate circuit on entering the said first state, and to be set to its second state each time a current pulse is initiated.

* * * * *